(12) United States Patent
Hishmeh

(10) Patent No.: US 12,137,139 B2
(45) Date of Patent: Nov. 5, 2024

(54) SYSTEMS, DEVICES, AND METHODS RELATED TO DESYNCHRONIZING CO-LOCATED DEVICES WITH TRANSACTION SHIFT

(71) Applicant: SKYWORKS SOLUTIONS, INC., Irvine, CA (US)

(72) Inventor: Samuel F. Hishmeh, Nolensville, TN (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

(21) Appl. No.: 18/211,964

(22) Filed: Jun. 20, 2023

(65) Prior Publication Data

US 2024/0015214 A1    Jan. 11, 2024

Related U.S. Application Data

(60) Provisional application No. 63/354,212, filed on Jun. 21, 2022.

(51) Int. Cl.
*H04L 67/1095*    (2022.01)

(52) U.S. Cl.
CPC .............................. *H04L 67/1095* (2013.01)

(58) Field of Classification Search
None
See application file for complete search history.

(56) References Cited

U.S. PATENT DOCUMENTS

| 2010/0173586 A1* | 7/2010 | McHenry | H04W 16/14 455/62 |
| 2013/0094536 A1* | 4/2013 | Hui | H04B 1/713 375/135 |
| 2021/0223762 A1* | 7/2021 | Stay | G05B 19/41845 |

OTHER PUBLICATIONS

Baatz et al. "Handoff support for mobility with IP over Bluetooth", Jan. 1, 2000, IEEE, Proceedings 25th Annual IEEE Conference on Local Computer Networks. LCN 2000 (2000, pp. 143-154) (Year: 2000).*

* cited by examiner

*Primary Examiner* — Davoud A Zand
(74) *Attorney, Agent, or Firm* — Chang & Hale LLP

(57) ABSTRACT

In some embodiments, a system can include a first arbiter device connected to a first network, the first arbiter device communicating with a first communication interval, a second arbiter device connected to a second network, the second arbiter device communicating with a second communication interval synchronized with the first communication interval; and a wireless network architecture that desynchronizes the first communication interval and the second communication interval.

20 Claims, 5 Drawing Sheets

SYSTEMS, DEVICES, AND METHODS RELATED TO DESYNCHRONIZING CO-LOCATED DEVICES WITH TRANSACTION SHIFT

CROSS-REFERENCE TO RELATED APPLICATION(S)

This application claims priority to U.S. Provisional Application No. 63/354,212 filed Jun. 21, 2022, entitled DESYNCHRONIZING CO-LOCATED DEVICES WITH TRANSACTION SHIFT, the disclosure of which is hereby expressly incorporated by reference herein in its entirety.

BACKGROUND

Field

The present disclosure relates to enhancing communication of wireless networks and wireless devices.

Description of the Related Art

An electronic device such as a computer, tablet, smartphone, or the like can interface with a user through a number of interface devices. Such interfacing functionality can be controlled and/or supported by, for example, an arbiter attached to or part of the electronic device, so as to allow appropriate transfer of information between the electronic device and the interface devices.

SUMMARY

In accordance with a number of implementations, the present disclosure relates to a system including: a first arbiter device connected to a first network, the first arbiter device communicating with a first communication interval; a second arbiter device connected to a second network, the second arbiter device communicating with a second communication interval synchronized with the first communication interval; and a wireless network architecture that desynchronizes the first communication interval and the second communication interval.

In some embodiments, the first network and the second network can be co-located.

In some embodiments, the wireless network architecture can introduce a shift amount to the second communication interval.

In some embodiments, the shift amount can be randomly selected.

In some embodiments, the shift amount can be a ratio of the second communication interval.

In some embodiments, the shift amount can be a predefined number.

In some embodiments, the shift amount can be repeatedly introduced to messages communicated over the second communication interval.

In some embodiments, introduction of the shift amount can be periodic.

In some embodiments, introduction of the shift amount can stop after N-number of times.

In some embodiments, introduction of the shift amount can stop after the second communication interval is drifted by a target amount.

In some embodiments, the second arbiter device can send a switch arbiter request to a client device connected to the first arbiter device.

In some embodiments, desynchronization of the first communication interval and the second communication interval can occur based on a determination that the switch arbiter request failed.

In some embodiments, the second arbiter device can connect to the client device.

In some embodiments, the second arbiter device can send a new messaging schedule to the client device, the new messaging schedule out-of-sync with the first communication interval.

In some embodiments, the client device can become synchronized with the second arbiter device based on the new messaging schedule.

In some embodiments, the second arbiter device can send a time indicative of when the new messaging schedule is to be applied at the client device.

In some embodiments, a wireless electronic device can be configured to send a first arbiter switch request to a client connected to a first network, determine that the switch request timed out, shift a communication interval, and send a second arbiter switch request on the shifted communication interval, the wireless electronic device connected to a second network.

In some embodiments, based on the second switch request, a connection to the client can be formed on the second network.

In some embodiments, the client can be synchronized on the second network.

In some embodiments, a computer-implemented method can include: sending a first switch arbiter request to a client device connected to an arbiter device on a first network, the first switch arbiter request sent on a first communication interval synchronized with a second communication interval associated with the arbiter device; shifting the first communication interval with a shift amount to make the first communication interval out of sync with the second communication interval; sending a second switch arbiter request to the client device, the second switch arbiter request sent on the first communication interval; and establishing a connection to the client device.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Advancements in wireless connectivity has enabled many traditionally wired applications to become entirely wireless. Wireless gaming, wireless audio, and wireless charging are but a few such transformed applications that have gone from wired to wireless. Unfortunately, the transformation of wired to wireless is not without challenges. One such challenge may arise in managing connectivity between or among multiple wireless devices.

Typically, wireless devices can be connected in a network having a topology. As an example of a topology, multiple client devices (e.g., a TV, a gaming console, a smartphone, a laptop, a wireless audio device(s), etc.) can be wirelessly connected to a central hub (e.g., a WiFi router) in a star, mesh, cluster-tree, combination thereof, or another topology. In some scenarios, there can be multiple such networks that are occupying similar or substantially similar space and have active wireless communication. These networks with overlapping spaces can be considered to be co-located.

User experience may be enhanced if one client device connected to a network can easily connect to a different network. For example, if a gamepad can easily change its host device from a smartphone of a network to a cloud gaming enabled TV of a different network, the user may continue the gaming experience using the same gamepad without unnecessary hassle.

Unfortunately, conventional technologies are challenged when multiple networks are co-located. Under conventional technologies, a host device of a network simply listens for discoverable devices. If the network and a different co-located network are synchronized in time, then the two networks and its devices may not be able to efficiently communicate with one another. Even if the devices were to eventually communicate, that communication may take undesirably long time to complete. Improved approaches disclosed herein can address such challenges by intelligently desynchronizing timings of the co-located networks.

Figure 1:
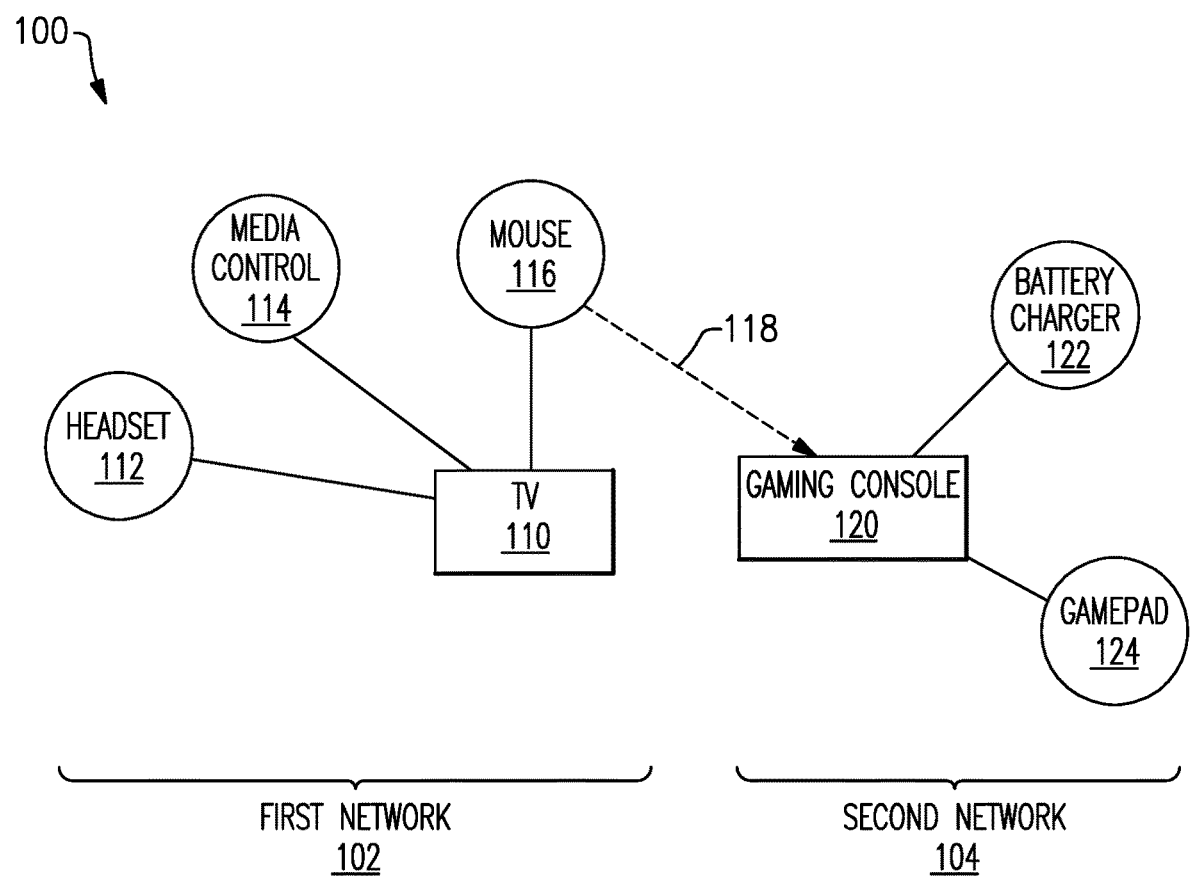
FIG. 1 depicts an example network topology of wireless electronic devices, in accordance with one or more embodiments.

FIG. 1 depicts an example network topology 100 of wireless electronic devices, in accordance with one or more embodiments. The example network topology 100 includes two networks 102, 104. A TV 110 is a central hub of a first network 102 and a gaming console 120 is a central hub of a second network 104. The TV 110 is wirelessly connected to a headset 112, a media control (e.g., a remote control) 114, and a wireless mouse 116. The gaming console 120 is wirelessly connected to a battery charger 122 and a gamepad 124.

In the present disclosure, the host devices 110, 120 are referred as "arbiters" or "arbiter devices" and the wireless devices 112, 114, 116, 122, 124 are referred as "clients" or "client devices." As described above, a user may desire to connect a client that is connected an arbiter of a network to a different arbiter (e.g., perform an arbiter switch) of a different network. For example, a user may desire to disconnect the mouse 116 from the TV 110 of the first network 102 and, instead, connect it to the gaming console 120 of the second network 104 as indicated by a dashed arrow 118. As described, under conventional technologies, the gaming console 120 may take a very long time in completing the arbiter switch when the first network 102 and the second network 104 are synced in time for their respective communications. It is noted that while the two networks 102, 104 in the example network topology 100 are depicted as networks having star topologies, any topology including star, mesh, cluster-tree, combination thereof, or another topology are contemplated.

Figure 2:
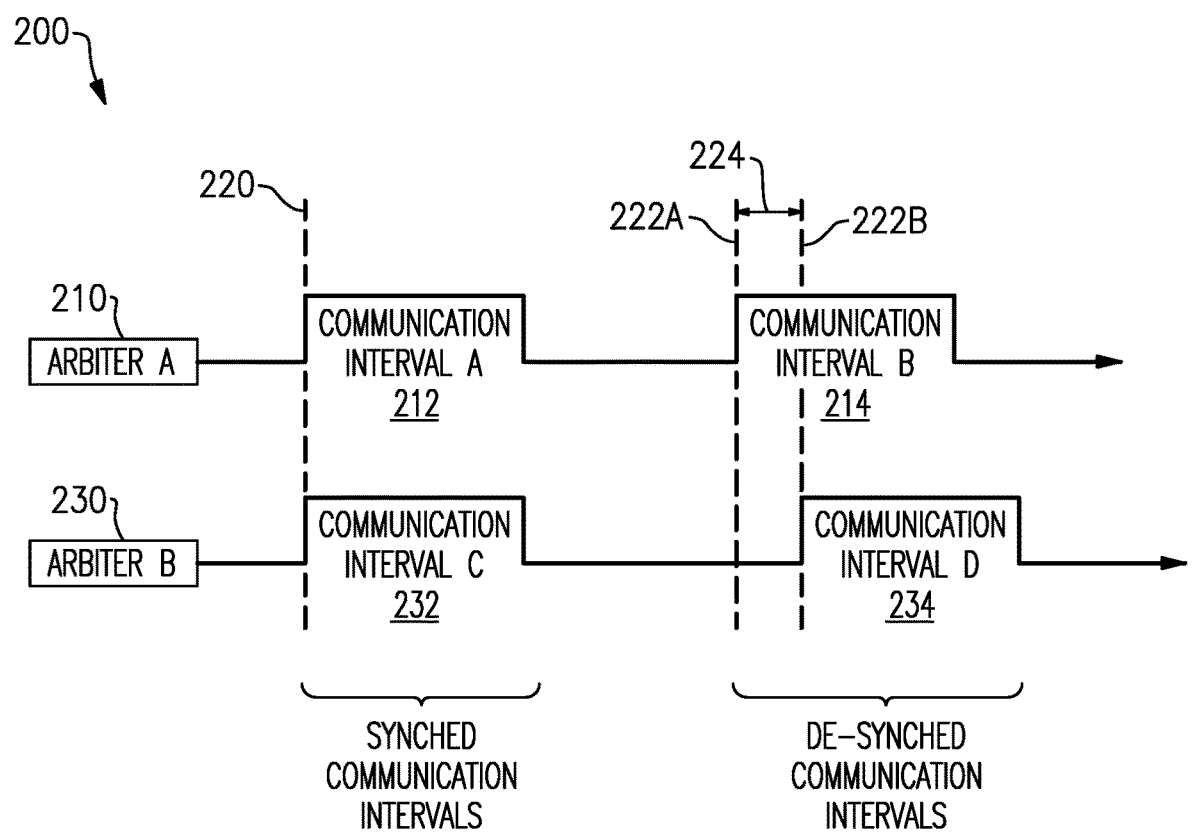
FIG. 2 depicts an example desynchronization of communication intervals, in accordance with one or more embodiments.

FIG. 2 depicts an example desynchronization 200 of communication intervals, in accordance with one or more embodiments. "Arbiter A" 210 can be a host device connected to a first network (e.g., the TV 110 of first network 102 in FIG. 1) and "arbiter B" 230 can be a host device connected to a second network (e.g., the gaming console 120 of the second network 104 in FIG. 1). It is assumed that the first network and the second network are co-located.

The two arbiters 210, 230 are each associated with respective timing diagrams. In the timing diagrams, time flows from left to right. As illustrated, arbiter A 210 has a timing diagram that is defined by "communication interval A" 212 and "communication interval B" 214. Similarly, arbiter B 230 has a timing diagram that is defined by "communication interval C" 232 and "communication interval D" 234. The communication intervals A 212 and B 214 indicate some example time durations in which arbiter A 210 can communicate with one or more devices of the first network. Similarly, the communication intervals C 232 and D 234 indicate some example time durations in which arbiter B 230 can communicate with one or more devices of the second network. As transactions (e.g., communications) can occur during the communication intervals A, B, C, and D 212, 214, 232, 234, a communication interval is a time length/duration/period in which one or more transactions may occur. Accordingly, a communication interval and transaction length may be deemed interchangeable for the present disclosure.

Continuing with FIG. 2, the timing diagrams of the arbiter A and B 210, 230 start off synched in time. For instance, the starting moment of the communication intervals A and C 212, 232 is aligned as indicated per the left line 220. Messages sent over the communication intervals A and C 212, 232 may interfere with one another and, thus, the arbiters A and B 210, 230 may not be able to communicate efficiently, if at all. It is possible to shift (or cause to drift) future communication intervals of an arbiter so that the future communication intervals are desynchronized from communication intervals of another arbiter. For instance, the communication interval D 234 of the arbiter B 230 can be shifted by a shift amount 224 (e.g., a time duration between the middle line 222A and the right line 222B) so that the communication interval D 234 stops aligning with the communication interval B 214 of the arbiter A 210. The misaligned communication intervals B and D 214, 234 desynchronizes (e.g., make out of sync) communications of the arbiters A and B 210, 230. The desynchronization can help ensure that the arbiters A and B 210, 230, and respective networks do not stay exactly in sync for lengthy, or extended, durations of time. It is noted that FIG. 2 illustrates two arbiters for convenience in descriptions but the described desynchronization method may be applied to any number of arbiters associated with any number of networks.

It is also to be noted that the timing diagrams are not drawn to scale. Thus, the shift amount 224 can be relatively small compared to the durations of the communication intervals A, B, C, or D 212, 214, 232, 234. Additionally, it is to be noted that the same or different shift amounts may continue to be applied to later communication intervals that follow the communication interval D 234. In other words, the application of the shift amount 224 can be once (shown) or repeated for any number of times (not shown for brevity), thereby causing a drift in the communication interval D 234. The application of the shift amount 224 may be periodic (e.g., app or otherwise).

In some embodiments, the arbiter B 230 may determine the shift amount 224 based on a formula. For instance, the arbiter B 230 may calculate the shift amount 224 that is $1/1000^{th}$, $1/500^{th}$, $1/100^{th}$, $1/50^{th}$, $1/20^{th}$, or any other ratio of the communication interval C 232. In some other embodiments, the arbiter B 230 may have a set shift amount (e.g., 5 microseconds, 10 microseconds, or any time duration). In some other embodiments, the arbiter B 230 may use a random shift amount that is within a defined range.

Figure 3:
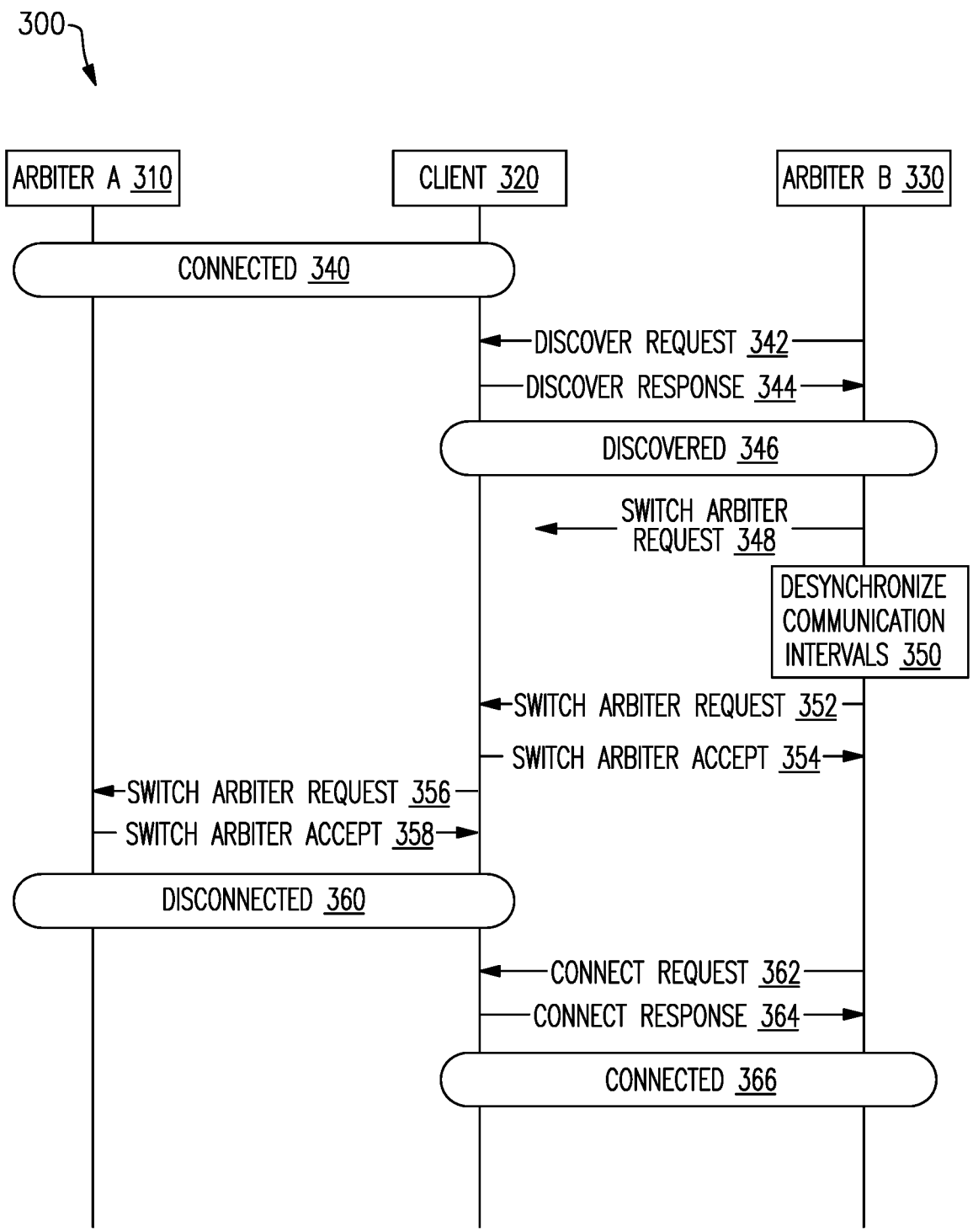
FIG. 3 depicts an example arbiter switch procedure for a client that receives an arbiter switch request, in accordance with one or more embodiments.

FIG. 3 depicts an example arbiter switch procedure 300 for a client that receives an arbiter switch request, in accordance with one or more embodiments. The example arbiter switch procedure 300 shows a client 320 that starts out connected to a first arbiter 310 ("Arbiter A") at block 340. In the example arbiter switch procedure 300, the first arbiter 310 and client 320 can be connected to a first network and the second arbiter 330 can be connected to a second network. See, for example, the TV 110 (e.g., the first arbiter 310) and the mouse 116 (e.g., the client 320) that are on the first network 102 and the gaming console 120 that is on the second network 104 in FIG. 1.

An arbiter may discover a client on another network using discover messages. For example, the second arbiter 330 can send a "discover request" message 342 to the client 320. If the client 320 can respond, the client may return a "discover response" message 344 to the second arbiter 330. In some instances, the second arbiter 330 may need to repeat its "discover request" message 342 before the client 320 becomes discoverable and/or ready to respond. Assuming the client 320 returns the "discover response" message 344, the client 320 can become discovered at block 346.

Once the client 320 is discovered, the second arbiter 330 may send a "switch arbiter request" message 348 to the client 320 outside its network. As described in relation to FIG. 2, the respective networks of the client 320 and the second arbiter 330 may be time-synced in communication intervals. Further, as described, such synchronized networks may not be able to provide satisfactory communications. Accordingly, the "switch arbiter request" 348 may be ignored by the client 320.

At block 350, the second arbiter 350 may shift its communication interval/transaction length and desynchronize its communication intervals as illustrated in FIG. 2. In some embodiments, the second arbiter 330 may perform the desynchronization upon a determination that the "switch arbiter request" 348 failed (e.g., timed out, was not received, or the like). The desynchronization can help ensure successful communications between the client 320 and the second arbiter 330. For example, the second arbiter 330 can later send another "switch arbiter request" message 352 and, as a result of the desynchronization, successfully receive a "switch arbiter accept" message 354 from the client 320. It is to be noted that the second arbiter 330 can perform the desynchronization at any point in time, including, before discovery (block 346) of or connection to (block 366) the client 320.

The client 320 can send a "switch arbiter request" message 356 to its currently active arbiter, the first arbiter 310. In some embodiments, the "switch arbiter request" message 356 may be the "switch arbiter request" message 354 that is now forwarded by the client 320 to the first arbiter 310. The first arbiter 310, can acknowledge the "switch arbiter request" message 356 and respond with a "switch arbiter response" message 358. At block 360, the client 320 can acknowledge the message 358 and disconnect from the first arbiter 310. After the disconnection, the client 320 can search for the second arbiter 330. The client 320 can receive a "connect request" message 362 from the second arbiter 330. Then, the client 320 can send a "connect response" message 364 that accepts the connection request. At block 366, the client 320 and the second arbiter 330 can make a connection.

Figure 4:
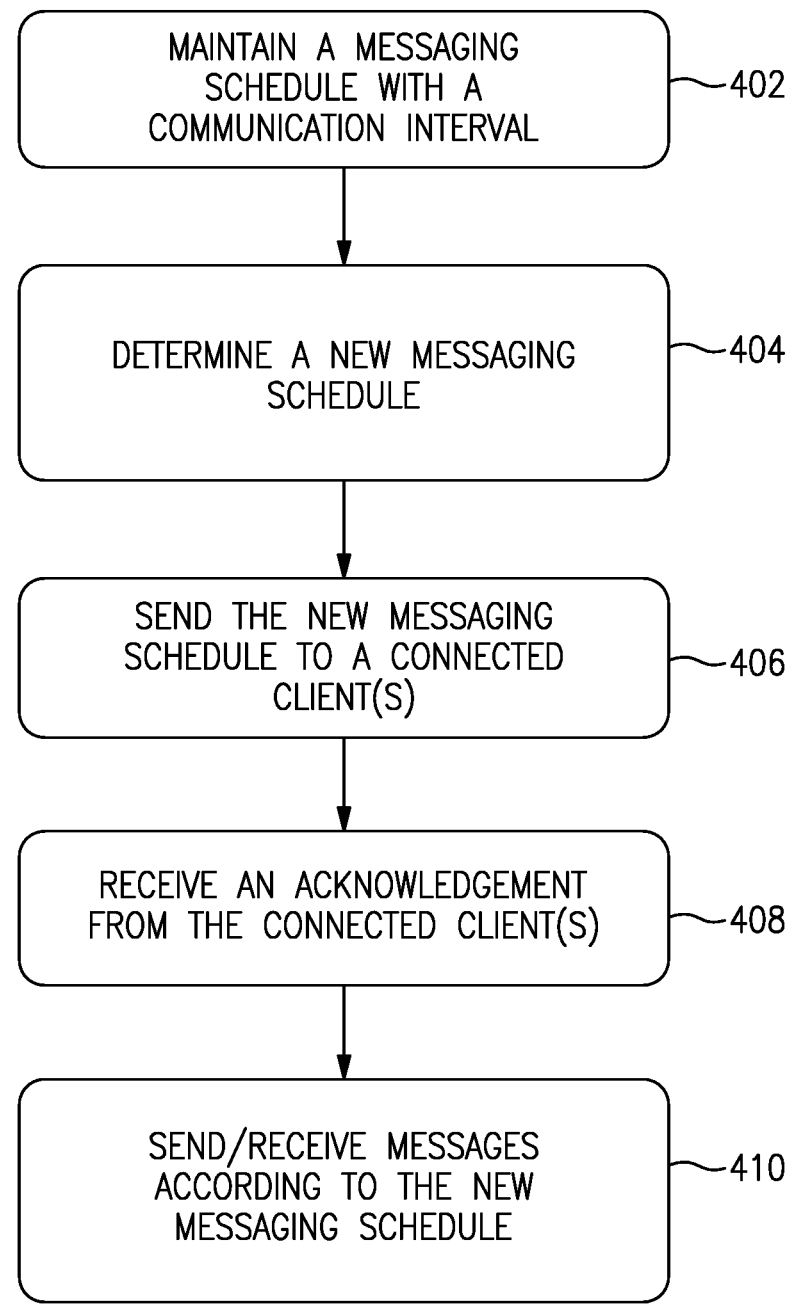
FIG. 4 depicts an example flowchart of a method that can be used to communicate a new messaging schedule for the future communication intervals to a client(s) connected to the same network, in accordance with one or more embodiments.

FIG. 4 depicts an example flowchart 400 of a method that can be used to communicate a new messaging schedule for the future communication intervals to a client(s) connected to the same network, in accordance with one or more embodiments. The method can be implemented at an arbiter as a control message to the client. As described in relation to FIG. 2, an arbiter of a network can be desynchronized from another arbiter on a different network. Further, as described in relation to FIG. 3, the arbiter can connect to a client that was previously connected to the different network. After the new connection, the arbiter and the client may be desynchronized in time. The control message implementing the method can help synchronize communication intervals between the arbiter and client. It is to be noted that this method can be applied to any number of clients to synchronize an arbiter and all clients on a network.

At block 402, the arbiter can be maintaining a messaging schedule with a communication interval (e.g., transaction length). Based on the messaging schedule, the arbiter could be communicating with the client device in-sync. For example, the arbiter can be the arbiter B 230 of FIG. 2 on a communication interval C 232 that is communicating with the client synced with the arbiter A 210 on the communication interval B 214.

At block 404, the arbiter can determine a new messaging schedule. The new messaging schedule can inform the client of how to adjust future communication intervals such that the client can become in sync with the arbiter. An example messaging schedule may be structured as:

Table 1.

| Example Messaging Schedule | |
|---|---|
| Field name | Description |
| Shift amount | Amount to shift communication intervals |
| Target | Condition to stop time shifting |

The example messaging schedule can include either or both of a shift amount and a target. The shift amount field can indicate how much a client should shift its future communication interval(s). For example, the shift amount can be the shift amount 224 of FIG. 2 based on which the communication interval D 234 is shifted. In some embodiments, the shift amount can be a time duration, such as 5 microseconds, 10 microseconds, or any time duration. In some other embodiments, the shift amount can be a ratio, such as $1/1000^{th}$, $1/500^{th}$, $1/100^{th}$, $1/50^{th}$, $1/20^{th}$, or any other ratio of a communication interval. Other variations, including various formulaic shift amount calculation, are possible.

As described, the time shift may be performed once or repeated multiple times to cause a drift. The target field can be an optional field that indicates a condition to stop the repetition. For example, a target can be a counter that decreases every time a future communication interval shifts and stops further drift once the counter expires. If the counter is 5, then future communication intervals are to shift/drift for 5 times and stop. As another example, the target can be a target drift amount which, when the latest communication interval is shifted by the target drift amount, should stop future communication intervals from further shifting. For instance, if the target drift amount is 20 microseconds and the shift amount is 5 microseconds, after four communication intervals that has shifted by 5, 10, 15, and 20 microseconds, latter communication intervals should not further shift. Many variations are possible.

At block 406, the arbiter can send the new messaging schedule to the client. At block 408, the arbiter can receive an acknowledgment of the new messaging schedule from the client. Here, the client uses the new messaging schedule and information therein (e.g., drift amount and target) to synchronize its future communication intervals with the arbiter. If the arbiter does not receive the acknowledgment, the arbiter may resend the new messaging schedule. At block 410, the arbiter can send/receive messages according to the new messaging schedule.

Figure 5:
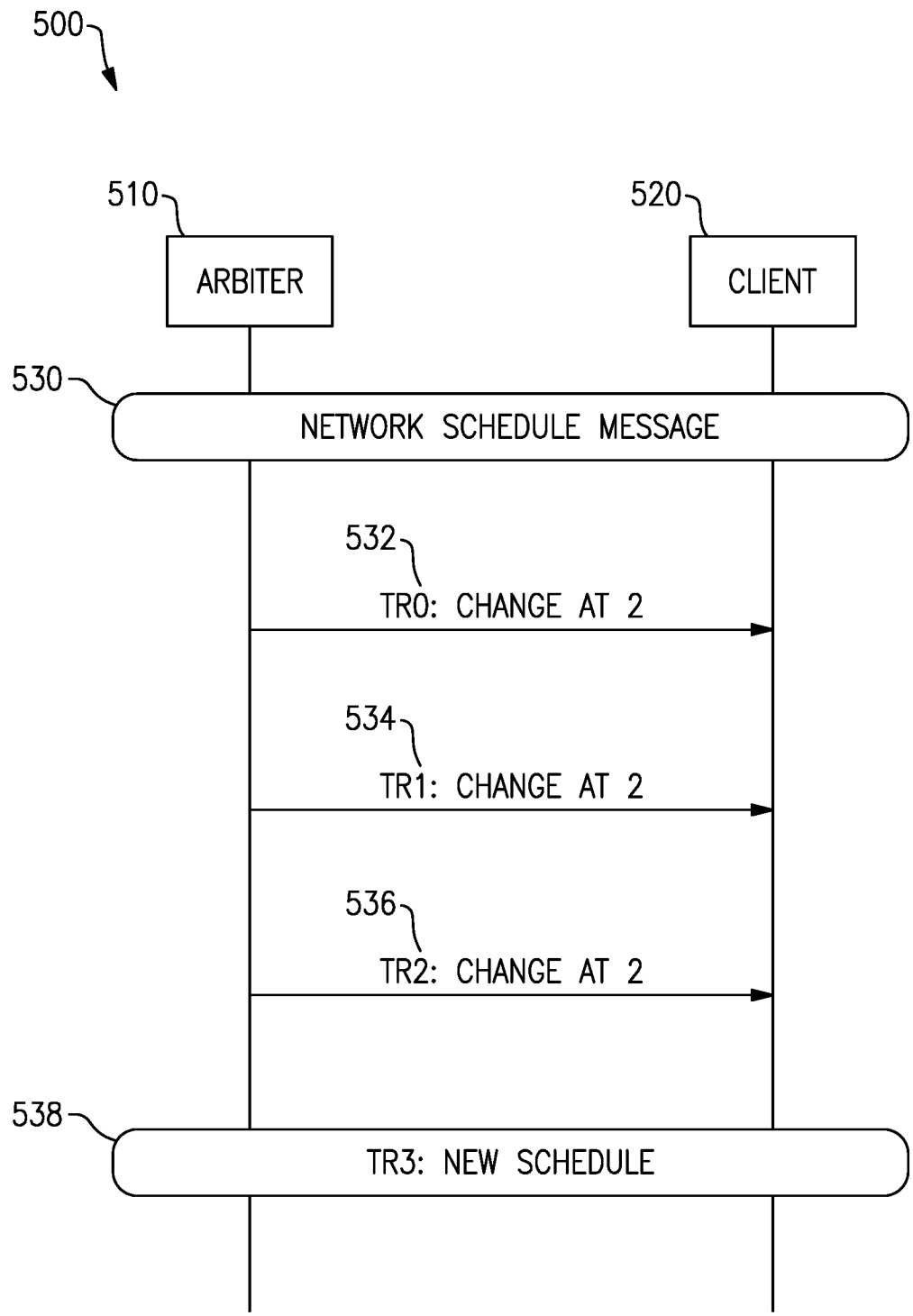
FIG. 5 depicts an example network reconfigure procedure that can be used to ensure synchronized communication intervals between an arbiter and a client(s), in accordance with one or more embodiments.

FIG. 5 depicts an example network reconfigure procedure 500 that can be used to ensure synchronized communication intervals between an arbiter and a client(s), in accordance with one or more embodiments. FIG. 4 described a method of informing a client of a new messaging schedule. It was further described that the method may be applied to multiple clients connected to the arbiter. However, in some instances, not all clients may be able to acknowledge the new messaging schedule at the same time. For instance, some clients could be asleep and miss the new messaging schedule. Thus, those clients may not be able to apply the new messaging schedule immediately to future communication intervals. Accordingly, the inability of the clients to acknowledge and apply the new messaging schedule at the same time can pose challenges.

The example network reconfigure procedure 500 can help address the challenges. In the procedure 500, an arbiter 510 is to be synchronized with a client 520 according to a network schedule message 530 that includes a new messaging schedule (e.g., the new messaging schedule sent at blocks 404 or 406 in FIG. 4).

Here, the new messaging schedule is not to be applied by the arbiter 510 and the client 520 immediately but to be applied at a future agreed upon time. The arbiter 510 can inform the client 520 of the future agreed upon time. For example, the arbiter 510 can send transactional messages 532, 534, 536 that the new messaging schedule should be applied for "transaction time 3." Having received the transactional messages 532, 534, 536, the client 520 applies the new messaging schedule at "transaction time 3." That is, the client is to apply/change to the new messaging schedule at or after the "transaction time 2" to be used starting at "transaction time 3." Accordingly, from "transaction time 3," communication intervals of the arbiter 510 and the client 520 can be synched consistent with the new messaging schedule. While three transactional messages 532, 534, 536 are illustrated in FIG. 5, it is to be noted that any number of transactional messages, including fewer messages, may be sent from the arbiter 510 to the client 520 between blocks 530 and 538. As shown, the transactional messages 532, 534, 536 can indicate when to apply/change to the new messaging schedule. In some embodiments, one or more transactional messages can indicate when to start using the new messaging schedule (e.g., the "transaction time 3").

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A system comprising:
    a first arbiter device connected to a first network, the first arbiter device communicating with a first communication interval;
    a second arbiter device connected to a second network, the second arbiter device communicating with a second communication interval synchronized with the first communication interval; and
    a wireless network architecture that desynchronizes the first communication interval and the second communication interval.

2. The system of claim 1 wherein the first network and the second network are co-located.

3. The system of claim 1 wherein the wireless network architecture introduces a shift amount to the second communication interval.

4. The system of claim 3 wherein the shift amount is randomly selected.

5. The system of claim 3 wherein the shift amount is a ratio of the second communication interval.

6. The system of claim 3 wherein the shift amount is a predefined number.

7. The system of claim 3 wherein the shift amount is repeatedly introduced to messages communicated over the second communication interval.

8. The system of claim 7 wherein introduction of the shift amount is periodic.

9. The system of claim 7 wherein introduction of the shift amount stops after N-number of times.

10. The system of claim 7 wherein introduction of the shift amount stops after the second communication interval is drifted by a target amount.

11. The system of claim 1 wherein the second arbiter device sends a switch arbiter request to a client device connected to the first arbiter device.

12. The system of claim 11 wherein desynchronization of the first communication interval and the second communication interval occurs based on a determination that the switch arbiter request failed.

13. The system of claim 12 wherein the second arbiter device connects to the client device.

14. The system of claim 13 wherein the second arbiter device sends a new messaging schedule to the client device, the new messaging schedule out-of-sync with the first communication interval.

15. The system of claim 14 wherein the client device becomes synchronized with the second arbiter device based on the new messaging schedule.

16. The system of claim 13 wherein the second arbiter device sends a time indicative of when the new messaging schedule is to be applied at the client device.

17. A wireless electronic device configured to send a first arbiter switch request to a client connected to a first network, determine that the switch request timed out, shift a communication interval, and send a second arbiter switch request on the shifted communication interval, the wireless electronic device connected to a second network.

18. The wireless electronic device of claim 17 wherein, based on the second switch request, a connection to the client is formed on the second network.

19. The wireless electronic device of claim 18 wherein the client is synchronized on the second network.

20. A computer-implemented method comprising:
   sending a first switch arbiter request to a client device connected to an arbiter device on a first network, the first switch arbiter request sent on a first communication interval synchronized with a second communication interval associated with the arbiter device;
   shifting the first communication interval with a shift amount to make the first communication interval out of sync with the second communication interval;
   sending a second switch arbiter request to the client device, the second switch arbiter request sent on the first communication interval; and
   establishing a connection to the client device.

* * * * *